(12) United States Patent
Palm

(10) Patent No.: US 8,052,363 B2
(45) Date of Patent: *Nov. 8, 2011

(54) SELF-TAPPING SCREW

(75) Inventor: Erich Palm, Au (CH)

(73) Assignee: SFS Intec Holding AG, Heerbrugg (CH)

( * ) Notice: Subject to any disclaimer, the term of this patent is extended or adjusted under 35 U.S.C. 154(b) by 649 days.

This patent is subject to a terminal disclaimer.

(21) Appl. No.: 11/688,950

(22) Filed: Mar. 21, 2007

(65) Prior Publication Data

US 2007/0154284 A1     Jul. 5, 2007

Related U.S. Application Data

(63) Continuation-in-part of application No. 10/490,936, filed as application No. PCT/EP02/10749 on Sep. 25, 2002, now Pat. No. 7,214,019.

(30) Foreign Application Priority Data

Sep. 27, 2001 (DE) .................. 101 47 767

(51) Int. Cl.
F16B 25/10 (2006.01)
(52) U.S. Cl. .................. 411/387.1; 411/387.2
(58) Field of Classification Search ............. 411/386, 411/387.1–387.8; 408/211, 212
See application file for complete search history.

(56) References Cited

U.S. PATENT DOCUMENTS

| | | | |
|---|---|---|---|
| 296,991 A | 4/1884 | Mitchell | |
| 2,654,284 A | 10/1953 | Schevenell | |
| 3,044,341 A | 7/1962 | Stern | |
| 3,207,024 A * | 9/1965 | Sommer | 411/387.1 |
| 3,438,299 A * | 4/1969 | Gutshall | 411/387.2 |
| 3,724,315 A * | 4/1973 | Sygnator | 411/386 |
| 3,937,120 A * | 2/1976 | Munse | 411/387.7 |
| 4,257,307 A * | 3/1981 | Regensburger | 411/387.1 |
| 4,271,554 A | 6/1981 | Grenell | |
| 4,453,361 A | 6/1984 | Hulsey | |
| 4,477,217 A * | 10/1984 | Bonacorsi | 411/387.4 |
| 4,480,951 A | 11/1984 | Regensburger | |
| 4,568,229 A | 2/1986 | Hulsey | |
| 4,963,064 A | 10/1990 | Peterson | |
| 5,120,172 A | 6/1992 | Wakai | |
| 5,529,449 A | 6/1996 | McSherry et al. | |

FOREIGN PATENT DOCUMENTS

| | | |
|---|---|---|
| DE | 9006590.5 | 9/1990 |
| DE | 4441716 | 5/1996 |
| EP | 0049218 | 3/1986 |
| FR | 2735191 | 12/1996 |

* cited by examiner

Primary Examiner — Flemming Saether
(74) Attorney, Agent, or Firm — Vople and Koenig, P.C.

(57) ABSTRACT

A self-tapping screw having a boring part and a threaded shaft for fixing a panel-type object to a preferably metallic substructure is provided. The screw is configured in such a way that it produces a through hole in the panel type object, said hole accommodating the shaft with a degree of play and so that it produces a bore in the substructure into which the thread on the shaft cuts a counter-thread. The boring part includes a boring tip that is located eccentrically in relation to the longitudinal axis of the screw. The tip centers the screw during the positioning operation in such a way that the boring part executes a circular displacement about the boring tip, which expands the through hole to the desired size, whereas the bore in the substructure is produced with the diameter of the boring part. The screw replaces self-tapping screws provided with boring flights and is preferably for use with a substructure consisting of thin sheet metal through which the boring flights of conventional screws can inadvertently penetrate.

5 Claims, 2 Drawing Sheets

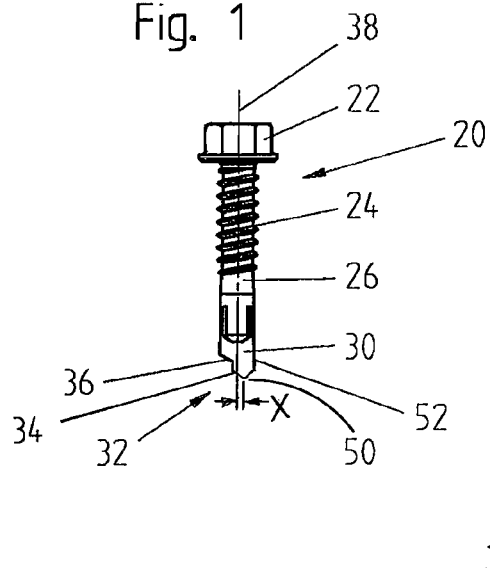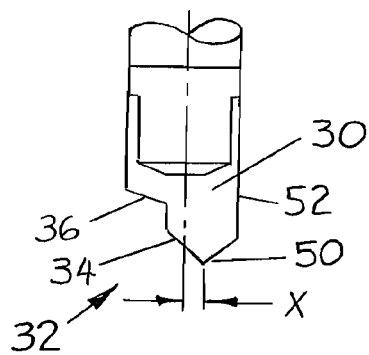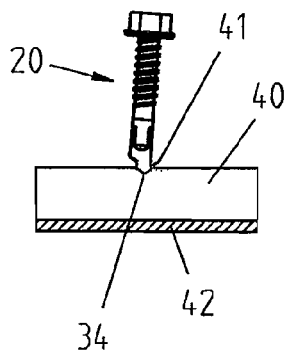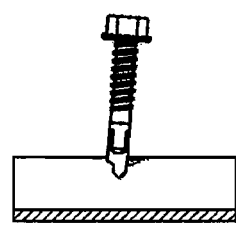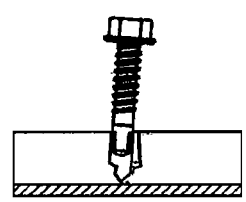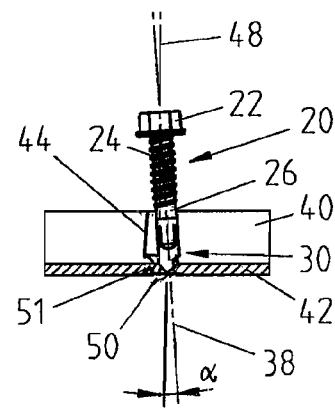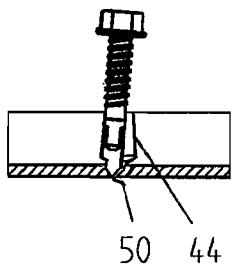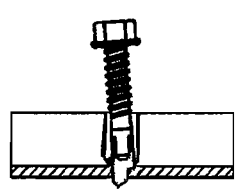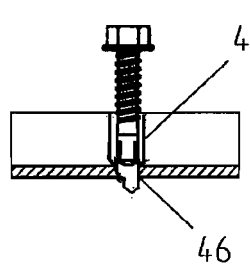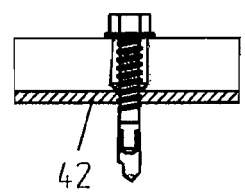

Fig. 10
Fig. 19
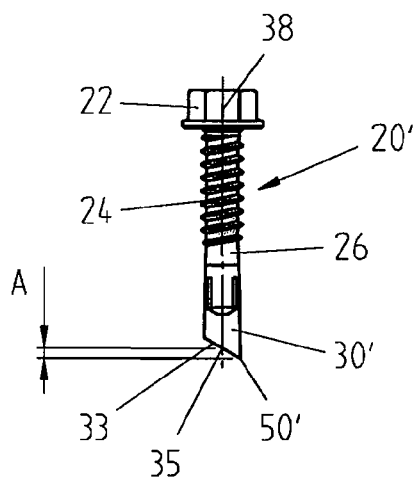
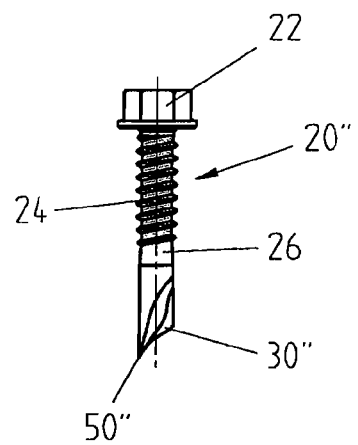
Fig. 11
Fig. 12
Fig. 13
Fig. 14
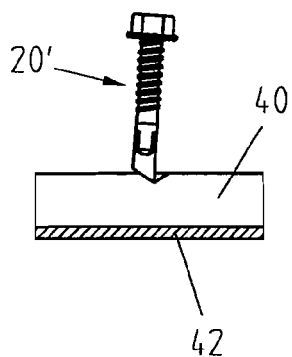
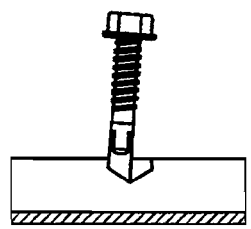
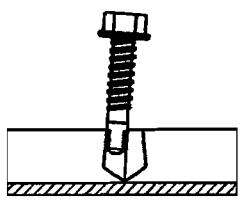
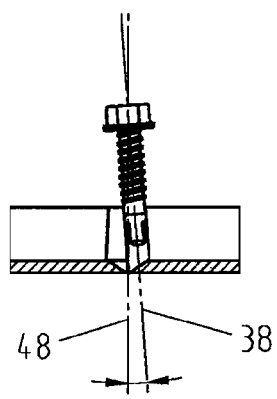
Fig. 15
Fig. 16
Fig. 17
Fig. 18
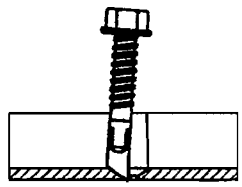
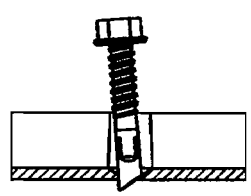
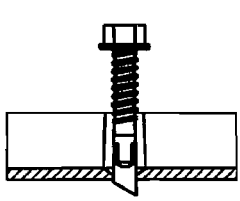
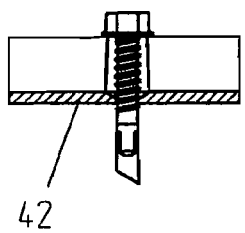

SELF-TAPPING SCREW

CROSS-REFERENCE TO RELATED APPLICATIONS

This application is a continuation-in-part of U.S. application Ser. No. 10/490,936, filed Mar. 26, 2004, which is a 371 National Phase of PCT/EP02/10749, filed Sep. 25, 2002, which claimed the benefit of priority from DE 101 47 767.8, filed Sep. 27, 2001, all of which are incorporated by reference herein as if fully set forth.

BACKGROUND

The invention relates to a self-tapping screw with a boring part and a threaded shaft for fixing a panel-type object to a substructure. The screw is configured so that it produces a through hole in the panel-type object that accommodates the threaded shaft with a degree of play. The screw is also configured so that it produces a bore hole in the substructure, in which the thread of the shaft cuts a counter-thread.

For the production of building paneling, typically panels are attached by screws to a substructure rigidly connected to the building. The panels consist of, e.g., ceramic, asbestos cement, stone, or a similar brittle material. The building paneling typically consists of metal, frequently of profiled sections made from thin sheet metal. The building paneling is exposed to large temperature fluctuations. When the sun is shining, the building paneling expands greatly relative to the substructure, which is covered by the building paneling, and then contracts again as the sunshine diminishes. Thus, the building paneling wanders on the substructure. To reduce thermal stresses in the building paneling, the attachment screws must not hinder the movements of the paneling. For this purpose, through holes, which accommodate the attachment screws with a sufficient degree of play, are provided in the panels. In the substructure itself, threaded bore holes are produced, in which the attachment screws are screwed.

For smaller building panels, the through holes can be produced in the panels and the threaded holes can be produced in the substructure by drilling or pre-drilling and then manually cutting the threads at the construction site. For larger building panels, self-tapping screws are used, which have a boring part and a shaft provided with a cutting thread. The self-tapping screws are configured so that they themselves produce in the panel-type object a through hole, which accommodates the threaded shaft with a degree of play, and so that they themselves produce in the substructure a bore hole, in which the thread of the shaft cuts a counter-thread. A self-tapping screw of the above-mentioned type, like that known from EP 0 949 218 B1, is suitable for this purpose. For this screw, freely projecting wings connect to a panel-type boring part at an axial distance from the boring tip perpendicular to the screw axis. The edge of the blades facing the boring tip is formed as a boring knife. At the connecting point of the wings to the boring part, there is a predetermined breaking notch extending approximately parallel to the screw axis. The boring tip of the boring part first drills a hole in a cover track made from light metal to be attached to a substructure. The hole is then expanded by the boring wings into a through hole accommodating the screw with a degree of play. Then the boring part with the boring tip penetrates into the substructure, wherein, after the passage of the boring part, the wings contact the substructure and break off at the predetermined breaking notches. For further rotation of the screw, the thread part of the shaft is then guided into the bore hole produced in the substructure, so that a thread is cut into the substructure and the final attachment can be realized. For the use of such self-tapping screws for the production of building paneling on a substructure made from thin sheet metal profiled sections, it has been shown that frequently the torque exerted on the wings by the thin sheet metal substructure is not enough to break off the wings. Consequently, the wings also penetrate and expand the bore hole in the substructure, so that the thread of the shaft cannot be held in the substructure.

SUMMARY

The object of the invention is to create a self-tapping screw of the type mentioned in the introduction such that a through hole accommodating the shaft of the screw with a degree of play is produced only in the panel-like object and not in a thin, preferably metallic substructure.

This object is achieved according to the invention by a self-tapping screw of the type mentioned in the introduction, for which the boring part has a boring tip arranged eccentrically relative to a longitudinal axis of the screw.

The eccentric arrangement of the boring tip of the screw according to the invention has the effect that the boring tip centers the screw in a panel-type object while this object is drilled through and the effect that, during the drilling process, the longitudinal axis of the screw encloses an angle with the center axis of the bore hole, so that at least one part of the boring part performs a circular motion about the center axis of the bore hole for a centered boring tip and thus produces an expanded through hole, whose diameter does vary in magnitude over the longitudinal center axis of the bore hole, but can equal up to twice the diameter of the boring part according to the degree of eccentricity of the boring tip relative to the longitudinal axis of the screw. When the boring tip of the boring part penetrates the preferably metallic substructure and emerges increasingly at its bottom side, the centering effect of the boring tip increasingly lessens. The boring tip itself then makes the circular motion about the center axis of the bore hole, which, however, decreases with increasing drilling progress, because the angle enclosed between the longitudinal axis of the screw and the center axis of the bore hole decreases constantly. When both axes finally coincide, the boring part still only performs a rotational motion about the longitudinal axis of the screw and produces the bore hole in the substructure with a diameter, which is equal to the diameter of the boring part.

Advantageous configurations of the invention form the objects of the dependent claims.

In one configuration of the self-tapping screw according to the invention, in which the boring tip is arranged at an external, radial edge of the boring part, the entire boring part performs the circular motion mentioned above, so that the diameter of the bore hole in the substructure reaches twice the diameter of the boring part.

In another configuration of the self-tapping screw according to the invention, in which the boring part is a thin boring plate, this also has the production advantages exhibited by the known screw described in the introduction. Namely, the boring part can be manufactured together with the wings in one production step as a mass-produced part. Therefore, no milling of the boring tip and no separate forming of the wings is required, which enables an economical and inexpensive production of the entire self-tapping screw. In addition, it is possible to provide such a thin boring plate for screws, which consist of light metal, non-ferrous metal, steel, stainless steel, or plastic.

In another configuration of the self-tapping screw according to the invention, if the boring part is formed on the shaft, this configuration of the screw is suitable for production from a heat-treatable material, such as a carbon steel. Preferably, the boring part is produced by pressing the shaft and then heat treated. However, it can also be produced on a separate shaft part and welded to the shaft of the screw, which has the thread or which receives the thread at a later time.

In another configuration of the self-tapping screw according to the invention, if the boring part has a cutting edge, which has two axially offset cutting regions, a small hole, which is then expanded to the diameter of the boring part with the axially offset second cutting region, can be pre-drilled in a simple way in the substructure with the cutting region adjacent to the boring tip.

In another configuration of the self-tapping screw according to the invention, if the cutting regions are offset opposite each other in the axial direction in a plane extending through a longitudinal axis of the screw, the boring part can be produced especially simply as a sheet-type mass-produced part, e.g., through stamping.

In another configuration of the self-tapping screw according to the invention, if the axial offset of the cutting regions is adapted to the thickness of the substructure to be bored, it is guaranteed that the bore hole in the substructure receives a diameter, which becomes equal at the most to the diameter of the boring part over the entire length of the bore hole, before the counter-thread is cut in the bore.

In another configuration of the self-tapping screw according to the invention, if the boring part has a cutting edge, which is diagonal relative to the longitudinal axis of the screw and which extends out from the boring tip over the entire width of the boring part, the same results can be achieved with this boring part as with the boring part in the configuration of the invention, for which the cutting edge has two axially offset cutting regions.

In another configuration of the self-tapping screw according to the invention, if an axial distance between the boring tip and a cutting point of the cutting edge and the longitudinal axis of the screw is adapted to the thickness of the substructure to be bored through, it is guaranteed in turn that the bore hole in the substructure receives a diameter, which becomes equal at most to the diameter of the boring part over the entire length of the bore hole, before the counter-thread is cut in this bore hole.

BRIEF DESCRIPTION OF THE DRAWINGS

Embodiments of the invention are described in more detail in the following with reference to the drawings. Shown are FIG. 1 is a view of a first embodiment of a self-tapping screw according to the invention, FIG. 1a is an enlarged view of the boring part of the self-tapping screw of FIG. 1, FIGS. 2-9 show the process of attaching a panel-type object to a substructure using the screw according to FIG. 1, FIG. 10 shows a second embodiment of the self-tapping screw according to the invention, FIGS. 11-18 show the process of attaching a panel-type object to a substructure using the screw according to FIG. 10, and FIG. 19 shows a third embodiment of the self-tapping screw according to the invention.

DETAILED DESCRIPTION OF THE PREFERRED EMBODIMENTS

FIG. 1 shows a first embodiment of a self-tapping screw according to the invention, which is designated overall with 20. The screw 20 has a head 22, a shaft 26 provided with a thread 24, and a boring part 30. The boring part 30 is a thin boring plate in the embodiment of FIG. 1, as shown in detail in FIG. 1a. The thin boring plate is fixed in a slot in the shaft 26 on the end of the shaft opposite the head 22. The boring part 30 has a cutting edge, which is designated overall with 32 and which has two axially offset cutting regions 34, 36. The screw 20 has a longitudinal axis 38. The cutting regions 34, 36 are offset relative to each other in the axial direction in a plane extending through the longitudinal axis 38 of the screw 20. Here, the cutting regions 34, 36 offset relative to each other in the axial direction are also set at an angle relative to one another, although they could be parallel to each other. The boring tip 50 is offset by a distance X from the longitudinal axis 38. According to the illustration in FIGS. 2-9, the screw 20 is used for fixing a panel-type object 40 to a substructure 42, which here consists of thin sheet metal (with a thickness of, e.g., 0.8-1.2 mm). The panel-type object 40 is a panel of building paneling, for example. The axial offset of the cutting regions 34, 36 is adapted to the thickness of the substructure 42 to be bored. In the illustration in FIGS. 2-9, the axial offset is approximately equal to the thickness of the substructure 42.

The previously described configuration of the screw 20 is used for the purpose of producing in the panel-type object 40 a through hole 44 (FIG. 8), which accommodates the shaft 26 with the thread 24 with a degree of play, and for producing in the substructure 42 a bore hole 46, in which the thread 24 of the shaft 26 cuts a counter-thread. For this purpose, the boring part 30 has a boring tip 50 arranged eccentrically by the distance X relative to the longitudinal axis 38 of the screw 20. In the embodiment shown in FIGS. 1-9, the boring tip 50 is arranged inwardly from an outer edge 52 of the boring part 30 in the radial direction. However, it is possible to arrange the boring tip 50 at the outer edge 52 such that the dimension X from the longitudinal axis 38 of the screw equals the radius. Those skilled in the art will recognize that the smaller the dimension X, the smaller the diameter of the through hole 44 that will be produced. This will be made clear from the following discussion.

The effect of the eccentrically arranged boring tip 50 during the setting of the self-tapping screw 20 is described in detail in the following with reference to FIGS. 2-9.

Starting at the beginning of the boring process in the panel-type object 40, FIG. 2, the boring tip 50 forms a centering tip for the screw 20. With the front cutting region 34 in the axial direction, which performs a circular motion about a vertical center axis 48 (cf. FIG. 5) of the later through hole 44 extending through the boring tip 50, a small hole 41 is pre-drilled. The longitudinal axis 38 of the screw 20 here forms an angle α with the center axis 48, as shown in FIG. 5. To set the screw 20, any arbitrary turning tool can be used, which has sufficient play in the receptacle part for the head 22 to allow the diagonal arrangement of the screw 20, as shown in FIGS. 2-8. The turning tool merely has to be rotated about its own axis. It should not perform any kind of back and forth or circular motion. It is sufficient when the boring part 30 performs a circular motion about the center axis 48. With increasing drilling progress, finally the entire cutting edge 32 of the boring part 30 is used to produce the through hole 44 in the panel-type object 40, as shown in FIGS. 3 and 4. Due to the circular motion of the boring part 30, the through hole 44 is not cylindrical, but instead conical, wherein it increases in diameter in the direction towards the substructure 42. Then the boring tip 50 penetrates into the substructure 42, so that the same boring process as in the panel-type object 40, whose beginning is shown in FIG. 2, repeats in the substructure 42, FIGS. 5 and 6. In FIG. 6, the boring tip 50 has reached the bottom side of the substructure 42. The through hole 44 is now expanded by the circular motion of the boring part 50 to its maximum size. In the shown embodiment, in which the boring part 50 is spaced in from the outer edge 52 of the boring part 30 in the radial direction, the diameter of the through hole 44 which is formed is equal to twice the sum of the radius of the boring part +X (i.e.2(r+X)). For the case when X=r, the diameter of the through hole is twice the diameter of the boring part 30 (i.e., 2d). When the boring tip 50 of the boring part 30 penetrates the substructure 42 and emerges more and more at its bottom side, FIGS. 7 and 8, the centering effect of the boring tip 50 becomes less and less. The boring tip 50 itself then makes the circular motion about the center axis 48 of the through hole 44, which decreases, however, with increasing drilling progress, because the angle α enclosed between the longitudinal axis 38 of the screw 20 and the center axis 48 of the through hole 44 constantly decreases until the entire boring part 30 is finally accommodated in the substructure 42, FIG. 8. In this phase of the boring progress, the two axes 38 and 48 coincide. The boring part 30 still only performs a rotational motion about the longitudinal axis 38 and produces the bore hole 46 in the substructure 42 with a diameter, which is equal to the diameter of the boring part 30, FIG. 8. Finally, with further advance of the screw 20, the thread 24 of the shaft 26 penetrates into the bore hole 46 to cut a counter-thread in the bore hole. This thread finally sets the screw 20, FIG. 9, wherein it can be seen that the shaft 26 of the screw 20 provided with the thread 24 has an over-dimensioned amount of play in the through hole 44. This amount could be reduced if the boring tip 50 were not arranged at the outer edge 52 of the boring part 30 in the radial direction, but instead more in the direction towards the longitudinal axis 38 of the screw 20, as described above.

During the setting of the screw 20, starting with the placement of the boring tip 50 on the panel-type object 40, FIG. 2, the screw is arranged diagonally such that a vertical axis, e.g., the center axis 48 of the through hole 44 and the bore hole 46, is passed through on one side by the boring tip 50 and on the other side by the center of the top side of the head 22 of the screw 20, as shown in FIG. 5. This guarantees that the head 22 merely turns about the center axis 48, thus does not perform a back and forth or circular motion, in contrast the boring part 30 performs the intended circular motion about the center axis 48 in order to widen the through hole 44 finally, as is the case starting with the illustration in FIG. 7. If the axial offset between the cutting regions 34 and 36 was selected smaller than the thickness of the substructure 42, the pre-drilled hole 51 in the substructure would be expanded to the hole 46 with a diameter, which would be greater than the diameter of the boring part 30.

FIG. 10 shows a second embodiment of the self-tapping screw according to the invention, which is here designated overall with 20'. The screw 20' is different from the screw 20 in that it has a boring part 30', which has a cutting edge 33, which is diagonal relative to the longitudinal axis 38 of the screw 20' and which extends from the boring tip 50 over the entire width of the boring part. The boring part 30' is either a thin boring plate fixed to the shaft 26 or is formed on the shaft 26. With the screw 20' with the boring part 30', the same results can be achieved as with the screw 20 with the boring part 30. So that this can be achieved, an axial distance A between the boring tip 50 and a cutting point 35 of the cutting edge 33 and the longitudinal axis 38 of the screw 20' is adapted to the thickness of the substructure 42 to be bored. Advantageously, the axial distance A is selected according to the same points of view as the axial offset of the cutting regions 34 and 36 of the boring part 30, so that the comments expressed there also apply here.

The process of setting the screw 20' is shown in FIGS. 11-18. The representations in FIGS. 11-18 correspond to the representations in FIGS. 2-9, so that the comments expressed for the latter also apply here and do not need to be repeated.

FIG. 19 shows a third embodiment of a self-tapping screw 20" according to the invention. The screw 20" has a boring part 30" pressed on the threaded shaft 26. The effect of the boring part 30" of the screw 20" corresponds to the effect of the boring part 30 or 30' of the screws 20 or 20', therefore the comments expressed there also apply for the embodiment according to FIG. 19.

The invention claimed is:

1. Self-tapping screw comprising a head, a boring part and a threaded shaft for attaching a panel to a substructure, wherein the screw is configured such that it produces a through hole in the panel, which accommodates the threaded shaft with a degree of play, and produces in the substructure a bore hole, in which the thread of the shaft cuts a counter-thread, wherein the boring part (30) has a boring tip (50) arranged eccentric relative to a longitudinal axis (38) of the screw (20) to define an initial drive axis offset by an angle a to the longitudinal axis, and a cutting edge lying in a plane parallel to the longitudinal axis and extending from the boring tip inclined across the screw to an opposite radial side of the shaft from the boring tip so that the boring part is adapted to cut the through hole up to twice the diameter of the boring part, the cutting edge (32) has first and second axially offset cutting regions (34, 36) that are axially spaced apart relative to each other by an axial portion that extends parallel to the longitudinal axis (38) of the screw (20) from an end of the first cutting region (34) inclined away from the tip to an end of the second cutting region that is oriented toward the tip.

2. Self-tapping screw according to claim 1, wherein the boring part (30) is a thin boring plate.

3. Self-tapping screw according to claim 1, wherein the boring part is formed on the shaft (26).

4. Self-tapping screw according to claim 1, wherein an axial offset of the cutting regions (34, 36) is adapted to a thickness of the substructure (42) to be bored.

5. Self-tapping screw according to claim 1, wherein the boring tip is offset from the longitudinal axis by a distance x that is greater than 0 and up to a radius of the boring part.

* * * * *